United States Patent [19]

Scherrer et al.

[11] Patent Number: 5,010,234

[45] Date of Patent: Apr. 23, 1991

[54] DEVICE FOR AIR-CONDITIONING PREMISES WITH EXCHANGE OF HEAT ENERGY BY LOW TEMPERATURE INFRARED RADIATION

[76] Inventors: Fernand Scherrer, 2 rue Georges Bizet, 68170 Rixheim; Joseph Rousset, 22 rue des Ecoles, 75005 Paris, both of France

[21] Appl. No.: 279,432

[22] Filed: Dec. 2, 1988

[30] Foreign Application Priority Data

Dec. 4, 1987 [FR] France .................. 87 16891
Jun. 23, 1988 [FR] France .................. 88 08461

[51] Int. Cl.⁵ ............................................. H05B 3/34
[52] U.S. Cl. ........................................ 219/213; 219/529; 392/435
[58] Field of Search ............ 219/213, 345, 528, 529, 219/549

[56] References Cited

U.S. PATENT DOCUMENTS

| 1,760,301 | 5/1930 | Dougherty | 219/217 |
| 2,782,289 | 2/1957 | Nathanson | 219/528 |
| 3,417,229 | 12/1968 | Shomphe | 219/213 |
| 3,766,644 | 10/1973 | Davis | 219/213 |
| 3,866,016 | 2/1975 | Tombu | 219/213 |
| 4,354,091 | 10/1982 | Bain | 219/213 |

FOREIGN PATENT DOCUMENTS

| 6914558 | 10/1969 | Fed. Rep. of Germany . |
| 2202208 | 8/1973 | Fed. Rep. of Germany . |
| 2310119 | 9/1973 | Fed. Rep. of Germany . |
| 3026098 | 2/1982 | Fed. Rep. of Germany . |
| 2356088 | 1/1978 | France .................. 219/528 |
| 1586934 | 3/1981 | United Kingdom ........ 219/528 |

Primary Examiner—Teresa J. Walberg
Attorney, Agent, or Firm—McAulay Fisher Nissen Goldberg & Kiel

[57] ABSTRACT

This invention relates to a device for air-conditioning premises, with exchange of heat energy by low temperature infrared radiation, comprising a flat element for exchanging heat energy by low temperature infrared radiation, extending parallel to a wall of the room, at a distance therefrom, wherein it comprises, between the heat exchanger element and the wall, an element reflecting the low temperature infrared radiation and, towards the interior of this room, a sheet stretched across the room, made of a material behaving in diathermic manner with respect to the low temperature infrared radiation, the heat exchanger element, the element reflecting the radiation and the sheet being hooked, along their edges, to walls of the room.

20 Claims, 3 Drawing Sheets

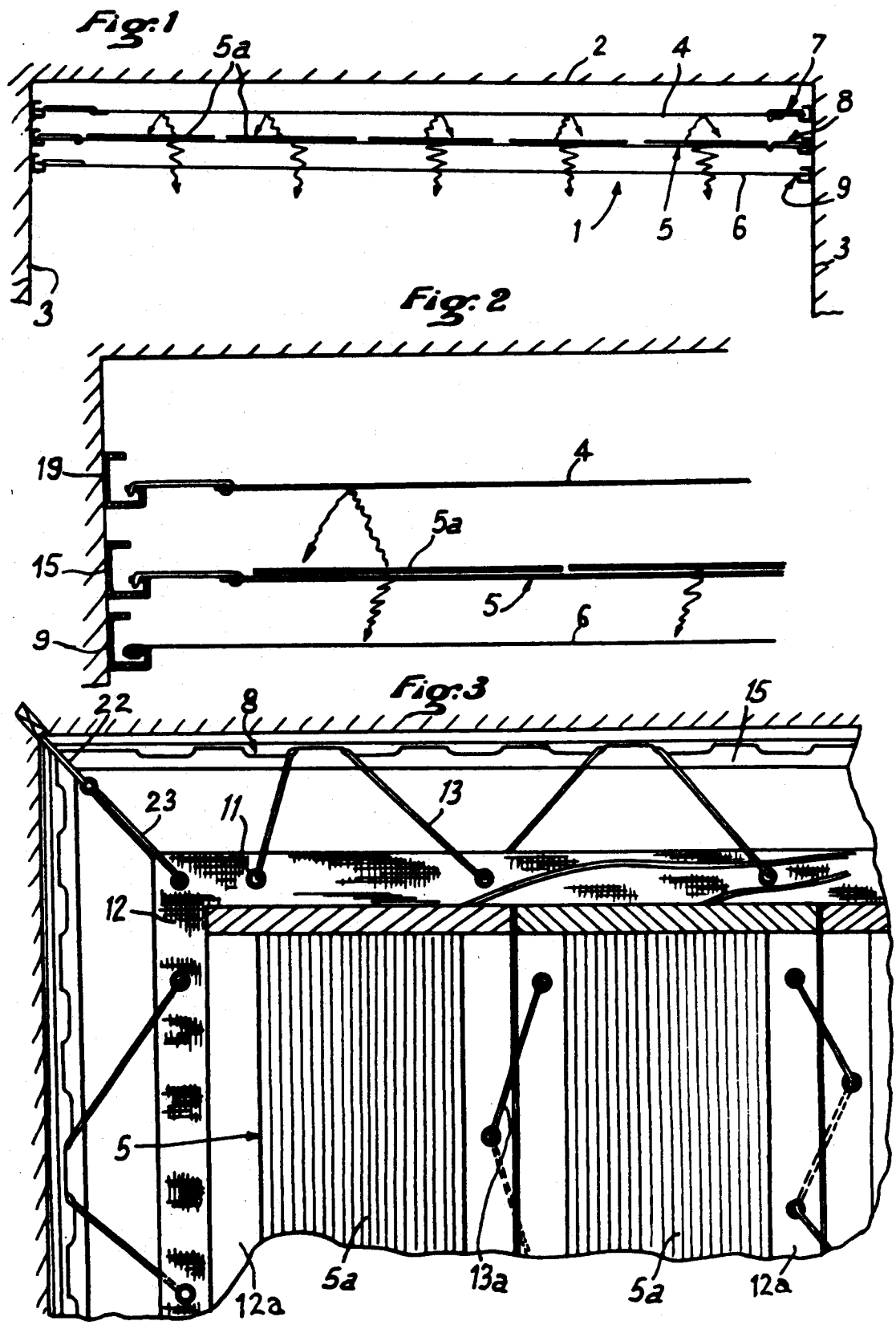

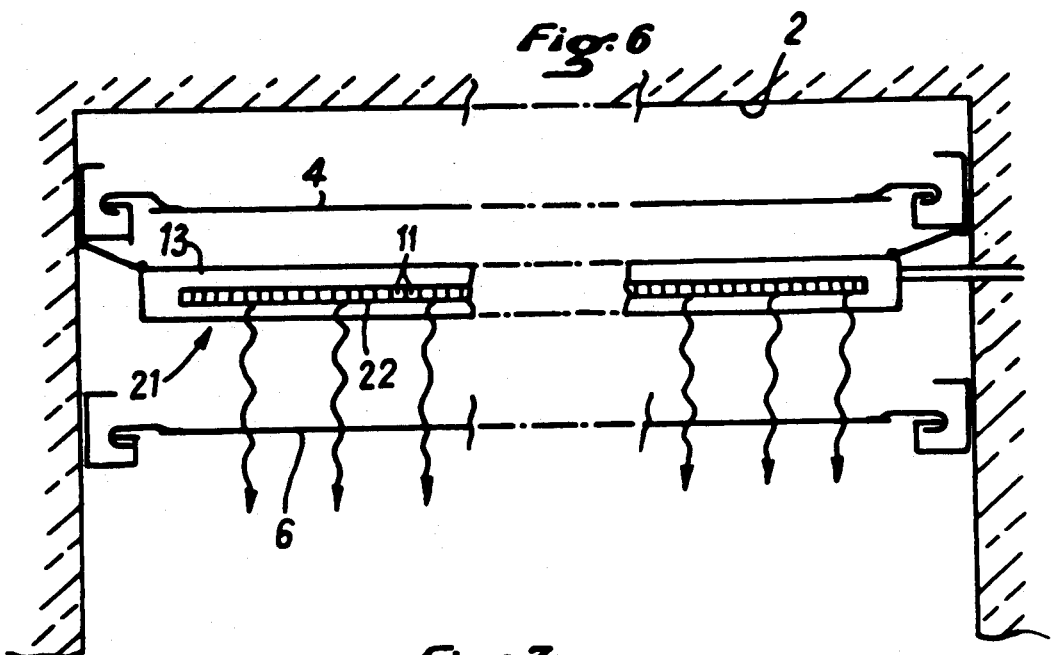
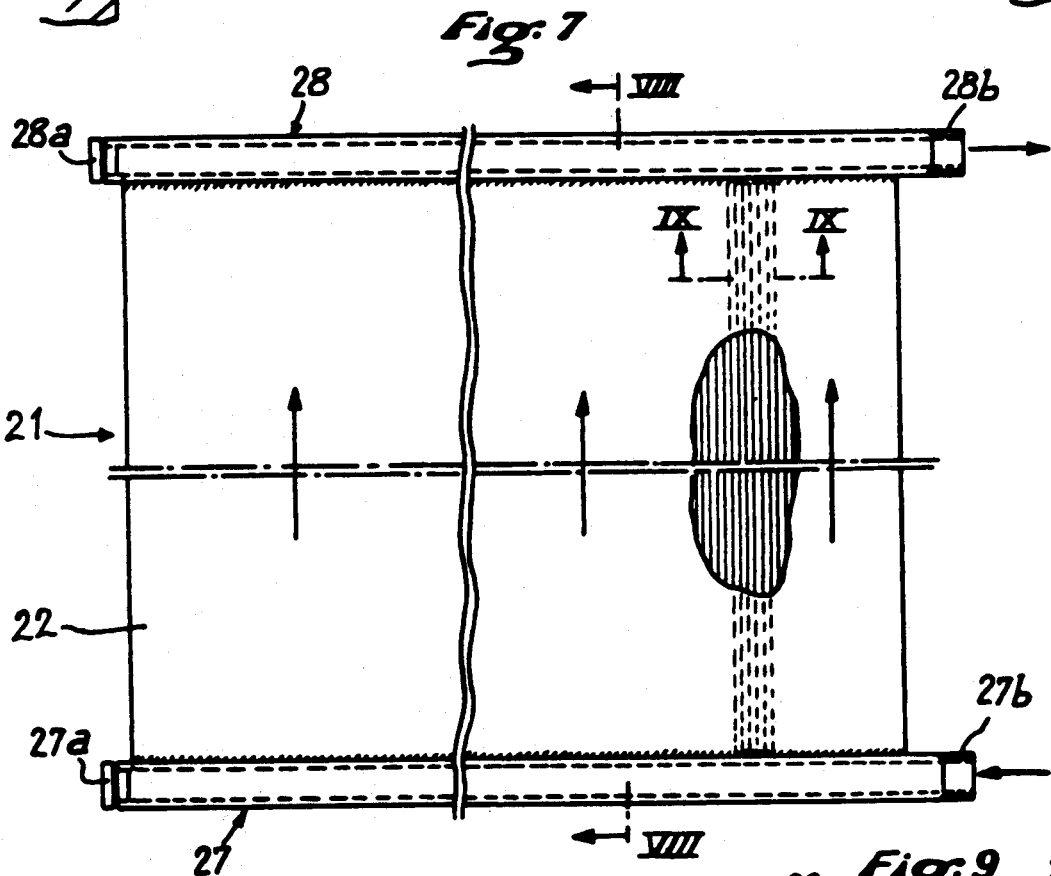
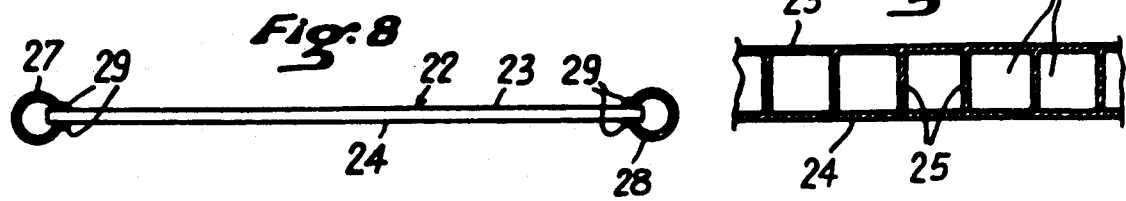

DEVICE FOR AIR-CONDITIONING PREMISES WITH EXCHANGE OF HEAT ENERGY BY LOW TEMPERATURE INFRARED RADIATION

FIELD OF THE INVENTION

The present invention relates to a device for air-conditioning premises with exchange of heat energy by low temperature infrared radiation.

BACKGROUND OF THE INVENTION

Presently used devices for exchange of heat energy with an environment at a different temperature are essentially of the type employing the convection mode. Closed circuit devices ensure almost exclusively heating, whilst open circuit devices (pulsed air) may ensure heating and/or cooling of dwellings or industrial premises. Other devices with heating film employ electricity as source of energy and they ensure an exchange of heat energy by radiation. However, these devices can obviously only ensure heating of the premises and their use is therefore forcibly limited.

For heating rooms in buildings, elements for heating by low temperature infrared radiation are already being used. The emitter elements used are generally constituted by foils or films which are fixed to a wall or a ceiling by clipping or adhesion by means of adhesive tapes. These low temperature infrared radiation emitter elements are in contact with an insulating cushion separating them from the wall and they are coated, towards the interior of the room, with a covering with which they are in contact. Such covering may be constituted by an added ceiling, on the upper face of which extends the low temperature infrared radiation emitter.

Although such a heating device offers the advantage of producing a flow of low temperature infrared radiation distributed regularly over the whole surface of the room, it nonetheless presents the drawback that it is relatively complex to operate, requiring relatively long manpower times. Furthermore, on the one hand, the thermal yield is not constant due to the properties of absorption of the radiation of the material constituting the covering or the added ceiling, which falsifies the calculations of the power to be installed, and, on the other hand, the existence of a stream of air between the various elements compromises the yield and is responsible for degradations of the materials used, by overheating.

It is an object of the present invention to overcome these drawbacks by providing a device of particularly simple design, of small dimensions and weight, with high energetic yield and adapted to ensure air-conditioning of premises, used equally well as emitter or absorber of heat energy.

SUMMARY OF THE INVENTION

To that end, this device for air-conditioning premises, with exchange of heat energy by low temperature infrared radiation, comprising a flat element for exchanging heat energy by low temperature infrared radiation, extending parallel to a wall of the room, at a distance therefrom, is characterized in that it comprises, between the heat exchanger element and the wall, an element reflecting the low temperature infrared radiation and, towards the interior of this room, a sheet stretched across the room, made of a material behaving in diathermic manner with respect to the low temperature infrared radiation, the heat exchanger element, the element reflecting the radiation and the sheet being hooked, along their edges, to walls of the room.

According to a particularly advantageous embodiment of the invention, the exchanger element is constituted by a panel of small thickness, of the order of a millimeter, traversed right through by parallel, juxtaposed internal channels, contiguous or not, with cross section of small dimensions (of capillary type), of which the watertight walls of small thickness are constituted by a material of low density, and by two pipes forming, respectively, collector and distributor of fluid, parallel and adjacent the two ends of the panel where the open ends of the juxtaposed internal channels thereof lie, these two ends being hermetically connected to two longitudinal slots opposite the two pipes forming collector and distributor, which are connected in closed circuit to a source of heat- or cold-transfer fluid so as to ensure permanent circulation of this fluid through the channels of the panel, from the pipe forming distributor to the pipe forming collector.

If the fluid which circulates in the panel is at a temperature higher than that of the environment, it yields heat energy to this environment, essentially by radiation and the device then heats the premises. On the other hand, if the fluid is at a temperature lower than that of the environment, it receives heat energy therefrom and the device then contributes to cooling the premises.

For the panel ensuring heat energy exchange with the environment to function essentially in radiation mode, the solid constituted by this panel is of the type with a low Biot number, i.e. the coefficient of linearized radiation and the ratio of its volume over its exchange surface are as small as possible for a coefficient of conductivity as large as possible.

The panel is advantageously constituted by two parallel foils of polymer or of metal, of low density, connected together by thin partitions forming cross-pieces and defining the internal channels of the panel which may have a square, rectangular, circular or other cross section.

As the device according to the invention is, by its nature, fragile, due to its very small thickness, vis-à-vis voluntary or involuntary aggressions such as shocks, cuts, accidental perforations, wear by friction, it is particularly advantageous to protect it by housing it, in a premises, at a distance from a wall or ceiling of the premises, by interposing between the heat exchanger panel and the wall an element reflecting the radiation towards the interior of the premises and by stretching, towards the interior of this premises, a sheet parallel to the wall, made of a material permeable to the radiation.

BRIEF DESCRIPTION OF THE DRAWINGS

The invention will be more readily understood on reading the following description with reference to the accompanying drawings, in which:

FIG. 1 is a view in vertical section of the upper part of a room of a building in which a heating device according to the invention is installed, parallel to the ceiling of the room.

FIG. 2 is a partial view in vertical section, on a larger scale, showing a mode of hooking the three constituent elements of the heating device to the walls of the room.

FIG. 3 is a plan view of a device for hooking the emitter element.

FIG. 6 is a view in vertical section of the upper part of a premises in which an air-conditioning device according to the invention is installed, parallel to the ceiling of the premises.

FIG. 7 is a plan view of the heat energy exchange device proper.

FIG. 8 is a view in vertical section made along line VIII—VIII of FIG. 7.

FIG. 9 is a view in vertical section, on a larger scale, made along line IX—IX of FIG. 7.

DETAILED DESCRIPTION OF THE DRAWINGS

Figure 4:
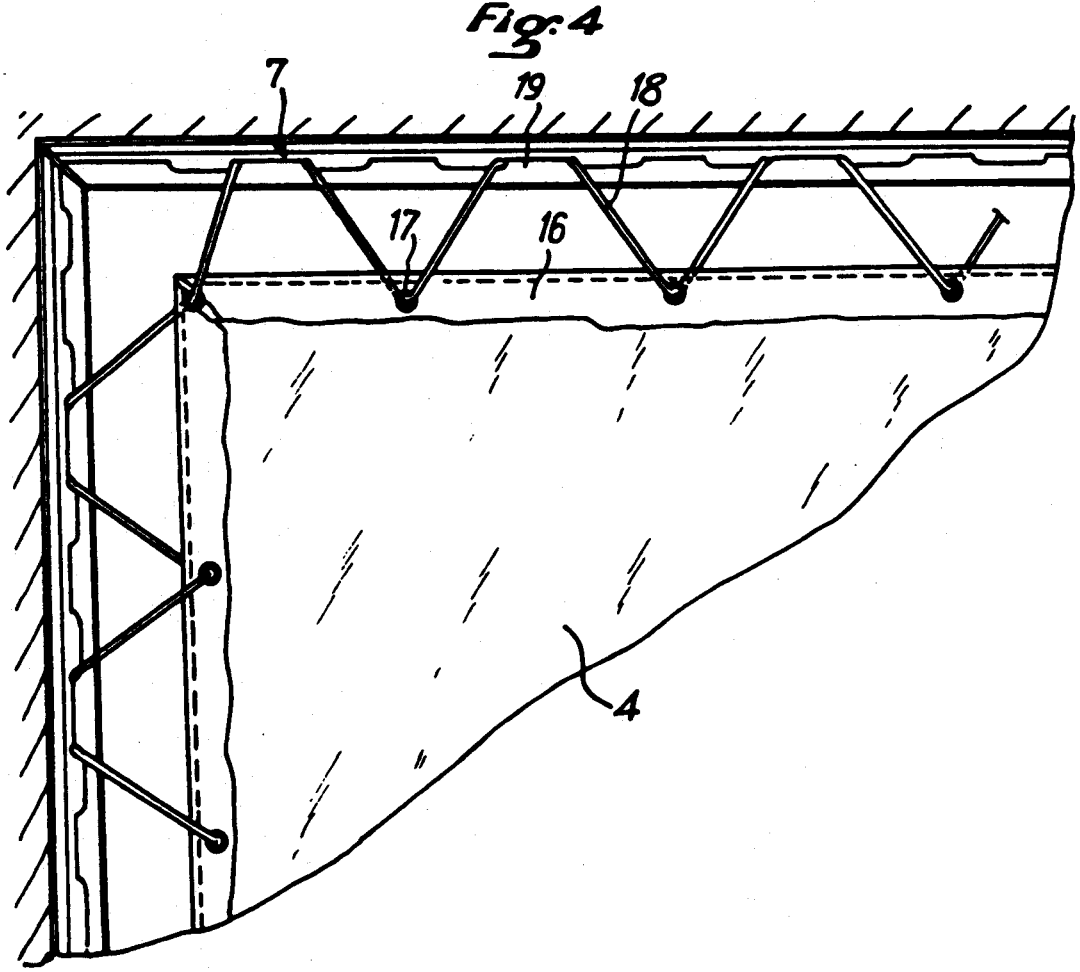
FIG. 4 is a partial plan view showing a device for hooking the reflector film to the walls of the room.

Referring now to the drawings, the air-conditioning device according to the invention, which is indicated as a whole by reference 1 in FIG. 1, is, in this non-limiting embodiment, a heating device which extends horizontally below the ceiling 2 of the room to be heated, between the walls 3 of this room. However, this assembly is not limiting and the heating device 1 may equally well extend vertically, parallel to a wall 3.

The heating device 1 comprises three superposed elements, namely, from top to bottom, an upper reflecting element 4, an intermediate element 5 emitting low temperature infrared radiation and a lower element 6 constituted by a stretched sheet made of cloth or plastics material, constituting an aesthetic false ceiling for the room. The three superposed elements 4, 5, 6 are hooked along their respective edges to walls 3 via devices 7, 8, 9.

The intermediate element 5 emitting radiation may be constituted by any material presently available on the market. Such an emitter element 5 is shown in FIG. 3. This emitter element 5 is constituted by juxtaposed individual films 5a which are adapted to be fixed to the walls 3. To that end, they are provided with accessories for assembling in zones reserved for fastening. These accessories comprise metal eyelets 11 crimped in perforations made in bands 12 located on the periphery of the assembly of the films 5a and in bands 12a surrounding each individual film 5a, these bands 12, 12a being reserved for fastening. The peripheral bands 12, 12a are advantageously constituted by a cloth or other incombustible material. The eyelets 11 have an appropriate diameter and are distributed at a distance from one another such that they allow a connection, by means of elastic or rigid ties 13a of the peripheral bands 12a, of the juxtaposed individual emitter films 5a with one another, in order to form a sheet, and on the perimeter of assembly by means of other ties 13, between the peripheral bands 12 and any hooking device 8 fixed on the walls of the room. This hooking device may be constituted by a continuous mounting 15 in the form of an angle hooked to the wall by its vertical arm and of which the serrated horizontal arm serves to hook the ties 13 of the emitter element 5. However, such hooking may also be effected from individual hooking points distant from one another on the wall 3.

Individual hooking points 22 and their ties 23 are designed to resist and to continue to maintain the elements 5 hooked to the walls and consequently to retain the reflecting element 4 in the event of fire.

Another type of assembly consists in fixing the individual emitter films 5a on an incombustible cloth (for example of glass, carbon fibers, etc...) of which the weft allows optimum passage of the infrared radiation but of which the nature and dimension of the mesh are such that, in the event of fire of the emitter films 5a, the association by adhesion or welding of the emitter films 5a on the incombustible support cloth limits propagation of the flames and avoids melting material dropping on the occupants of the premises, by retention in the meshes of the weave of the cloth. A treatment by retention of fireresistant product in the yarn constituting the weave may render this assembly self-extinguishing and substantially improve its behaviour in the event of fire.

Figure 5:
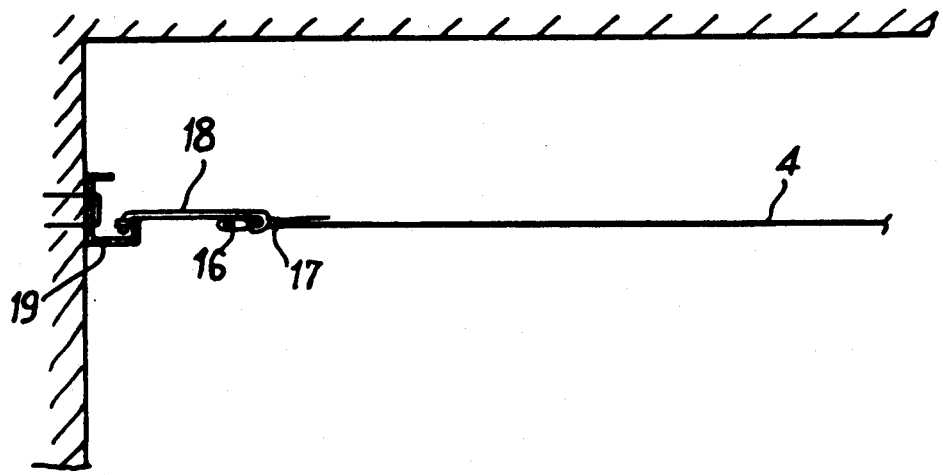
FIG. 5 is a partial view in vertical section illustrating the device for hooking the reflector film of FIG. 4.

FIGS. 4 and 5 illustrate a mode of hooking the upper reflecting element 4 to the walls 3 of the room. This upper reflecting element 4 is constituted by a film or a weave employing components such that its coefficient of reflection (for an electromagnetic radiation located, in the electromagnetic spectrum, in the so-called near-infrared emission band, viz. between about 0.6 micrometer and 12 micrometers), is maximum for an emission temperature ranging from 30° C. to 70° C. The reflector film 4 presents on its periphery a reinforcing element 16 pierced, at appropriate distances, with holes in which are crimped eyelets 17 and through these eyelets a rigid or elastic tie 18 passes, extending up to a hooking device 7 fixed to the walls 3. This hooking device may be constituted by a continuous mounting 19 of the same type as the mounting 15 serving to hook the radiation emitter element 5. However, the reflector film 4 might also be hooked by any appropriate means to individual hooking points distributed over the walls.

The lower suspended cloth 6 may be constituted by a cloth or sheet of plastics material available on the market. It is hooked, along its edge, to walls 3 via a mounting 9 fixed to the walls 3 in conventional manner.

The mountings 19, 15, 9 serving to hook the three superposed elements 4, 5, 6 may be separated from one another, as shown in the drawings, or they may be constituted by one and the same section.

In the variant embodiment shown in FIGS. 6 to 9, the device according to the invention ensures air-conditioning, i.e. the heating and/or cooling of the room in which it is mounted. It essentially comprises a flat heat exchanger 21 extending horizontally, i.e. parallel to the ceiling 2, being interposed between the flat upper reflector element 4 and the flat lower stretched sheet 6 likewise parallel to ceiling 2.

The heat exchanger 21 is constituted by a panel 22 of very small thickness, of the order of a millimeter. This panel is formed by two parallel thin sheets 23, 24 made of a polymer or metal of low density, and which are connected together by thin partitions 25 parallel to one another, forming crosspieces. These partitions define therebetween channels 26 which pass right through the panel and are open at their two opposite ends. In the non-limiting embodiment shown in the drawing, the channels 26 have a square cross section, but they might equally well have a rectangular, circular or other cross section. The two opposite edges of the panel 22 where the orifices of the internal channels 26 lie are engaged respectively in two pipes 27, 28 closed at one of their ends 27a, 28a and open at their other ends 27b, 28b in order to be connectable, in closed circuit, to an installation for circulation of a liquid or gaseous heat- or cold-transfer fluid. In the example illustrated in the drawing, the pipe 27 is the one via which the fluid is introduced and it consequently constitutes the distributor, whilst the other pipe 28 performs the role of collector, the path of the fluid in the exchanger being indicated by arrows. The two opposite edges of the panel 22 are engaged in longitudinal slots made in the walls of the two pipes 27, 28 and fastening is effected in hermetic manner, by means of seals 29.

The heat- or cold-transfer fluid which may be an appropriate liquid or gas available on the market, is heated or cooled outside the premises by any known device for converting energy, such as boiler, heat pump, refrigerating set with feed pump, etc. It is possible to vary the quantity of energy exchanged between the device according to the invention and its environment for a given installed exchanger surface, by varying the speed of circulation of the fluid and/or its temperature.

As shown in FIG. 6, the heat exchanger 21 is advantageously interposed between the upper reflector element 4 and the lower sheet 6 which is made of a material permeable to the radiation. The heat exchanger 21, the upper reflecting element 4 and the lower stretched sheet 6 are hooked to the walls of the room by any appropriate means.

As the device according to the invention is relatively fragile due to the use of a very thin panel, it is naturally preferable to make it in the form of units of small dimensions which are joined to one another to cover the whole surface of the ceiling or a wall of a room. Furthermore, it is judicious to provide means such as a net for supporting all the individual air-conditioning units forming the large heat exchanger device.

What is claimed is:

1. A device for air-conditioning premises, with exchange of heat energy by low temperature infrared radiation, comprising:

three suspended elements, the first suspended element being a reflector element, the second suspended element being a flat heat exchanger element, and the third suspended element being a first sheet;

said flat heat exchanger element exchanging heat energy by low temperature infrared radiation, said flat heat exchanger element extending parallel to a wall of the room and being spaced therefrom, said flat heat exchanger element being a low temperature infrared radiation emitter and including an assembly of juxtaposed individual films fixed to one another to form a second sheet;

said reflector element being positioned between said heat exchanger element and the wall, said reflecting element reflecting the low temperature infrared radiation;

said individual films being fixed on an incombustible cloth having a weft permitting optimum passage of the infrared radiation, said cloth having a mesh such that the nature and dimensions thereof are such that in the event of a fire affecting said films, the association by adhesion or welding of said films on the incombustible support cloth limits the propagation of the flames and avoids the melting material dropping onto the occupants of the premises, by retention in the meshes of the weave of the cloth;

said first sheet facing and being disposed towards the interior of the room and being stretched across the room, said first sheet being made of a material behaving in a diathermic manner with respect to the low temperature infrared radiation, said heat exchanger element and said reflector element; and means hooking each of said first and said second sheets along their edges to walls of the room.

2. The device of claim 1, wherein said reflecting element is a material having a coefficient of reflection for an electromagnetic radiation within the electromagnetic spectrum, in the near-infrared emission band between about 0.6 micrometers and 12 micrometers, and is maximum for an emission temperature ranging from 30° C. to 70° C.

3. The device of claim 2, wherein said upper reflecting element is constituted by a film having components of said coefficient of reflection.

4. The device of claim 2, wherein said upper reflecting element is formed of a material having a weave employing components having said coefficient of reflection.

5. The device of claim 1, wherein said hooking means includes:

a hooking device fixed to the walls, said reflector element being provided on its periphery with eyelets in the form of a reinforcing element having holes; and a tie passing through said holes and through said eyelets and extending up to said hooking device.

6. The device of claim 5, wherein said ties are elastic.

7. The device of claim 5, wherein said ties are rigid.

8. The device of claim 1, wherein said hooking means includes:

a hooking device fixed on the walls of the room, surrounding said assembly of juxtaposed individual films; and periphery bands extending from edges of said individual films, pierced with holes having therein crimped metal eyelets allowing passage of ties ensuring connection of said assembly with said hooking devices.

9. A device for air-conditioning premises, with exchange of heat energy by low temperature infrared radiation, comprising:

three suspended elements, the first suspended element being a reflector element, the second suspended element being a flat heat exchanger element, and the third suspended element being a sheet;

said flat heat exchanger element exchanging heat energy by low temperature infrared radiation, said flat heat exchanger element extending parallel to a wall of the room and being spaced therefrom;

said reflector element being positioned between said heat exchanger element and the wall and reflecting the low temperature infrared radiation; and said upper reflecting element being a material having a coefficient of reflection for an electromagnetic radiation line, in the electromagnetic spectrum, in the near infrared emission band, between about 0.6 micrometers and 12 micrometers, and is maximum for an emission temperature ranging from 30° C. to 70° C.;

said sheet facing and being disposed towards the interior of the room and being stretched across the room, said sheet being made of a material behaving in a diathermic manner with respect to the low temperature infrared radiation, said heat exchanger element and said reflector element; and means hooking said sheet along its edges to walls of the room.

10. The device of claim 9, wherein said upper reflecting element is constituted by a film having components of said coefficient of reflection.

11. The device of claim 9, wherein said upper reflecting element is formed of a material having a weave employing components having said coefficient of reflection.

12. The device of claim 9, wherein:

said flat heat exchanger element is a low temperature infrared radiation emitter and includes an assembly of juxtaposed individual films fixed to one another to form a second sheet; and said individual films are fixed on an incombustible cloth having a weft permitting optimum passage of the infrared radiation, said cloth having a mesh such that the nature and dimensions thereof are such that in the event of a fire affecting said films, the association by adhesion or welding of said films on the incombustible support cloth limits the propagation of the flames and avoids the melting material dropping on the occupants of the premises, by retention in the meshes of the weave of the cloth.

13. The device of claim 10, wherein:

said flat heat exchanger element is a low temperature infrared radiation emitter and includes an assembly of juxtaposed individual films fixed to one another to form a second sheet; and said individual films are fixed on an incombustible cloth having a weft permitting optimum passage of the infrared radiation, said cloth having a mesh such that the nature and dimensions thereof are such that in the event of a fire affecting said films, the association by adhesion or welding of said films on the incombustible support cloth limits the propagation of the flames and avoids the melting material dropping on the occupants of the premises, by retention in the meshes of the weave of the cloth.

14. The device of claim 11, wherein:

said flat heat exchanger element is a low temperature infrared radiation emitter and includes an assembly of juxtaposed individual films fixed to one another to form a second sheet; and said individual films are fixed on an incombustible cloth having a weft permitting optimum passage of the infrared radiation, said cloth having a mesh such that the nature and dimensions thereof are such that in the event of a fire affecting said films, the association by adhesion or welding of said films on the incombustible support cloth limits the propagation of the flames and avoids the melting material dropping on the occupants of the premises, by retention in the meshes of the weave of the cloth.

15. The device of claim 9, wherein said hooking means includes:

a hooking device fixed to the walls, said reflector element being provided on its periphery with eyelets in the form of a reinforcing element having holes; and a tie passing through said holes and through said eyelets and extending up to said hooking device.

16. The device of claim 15, wherein said ties are elastic.

17. The device of claim 15, wherein said ties are rigid.

18. The device of claim 15, wherein:

said flat heat exchanger element is a low temperature infrared radiation emitter and includes an assembly of juxtaposed individual films fixed to one another to form a second sheet; and said individual films are fixed on an incombustible cloth having a weft permitting optimum passage of the infrared radiation, said cloth having a mesh such that the nature and dimensions thereof are such that in the even of a fire affecting said films, the association by adhesion or welding of said films on the incombustible support cloth limits the propagation of the flames and avoids the melting material dropping on the occupants of the premises, by retention in the meshes of the weave of the cloth.

19. The device of claim 16, wherein:

said flat heat exchanger element is a low temperature infrared radiation emitter and includes an assembly of juxtaposed individual films fixed to one another to form a second sheet; and said individual films are fixed on an incombustible cloth having a weft permitting optimum passage of the infrared radiation, said cloth having a mesh such that the nature and dimensions thereof are such that in the event of a fire affecting said films, the association by adhesion or welding of said films on the incombustible support cloth limits the propagation of the flames and avoids the melting material dropping on the occupants of the premises, by retention in the meshes of the weave of the cloth.

20. The device of claim 17, wherein said hooking means includes hooking devices for hooking said three suspended elements, each said hooking device being constituted by individual hooking members fixed on the walls and spaced from one another.

* * * * *